US012703452B2

(12) United States Patent
Schumacher et al.

(10) Patent No.: US 12,703,452 B2
(45) Date of Patent: Aug. 11, 2026

(54) METHOD FOR DETERMINING A SUITABLE CURVE SPEED FOR VEHICLES, DEVICE FOR PERFORMING SAID METHOD, AND USE THEREOF

(71) Applicant: Robert Bosch GmbH, Stuttgart (DE)

(72) Inventors: Jan Schumacher, Yokohama (JP); Markus Henzler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 18/880,753

(22) PCT Filed: Jun. 13, 2023

(86) PCT No.: PCT/EP2023/065714
§ 371 (c)(1),
(2) Date: Jan. 2, 2025

(87) PCT Pub. No.: WO2024/008399
PCT Pub. Date: Jan. 11, 2024

(65) Prior Publication Data

US 2026/0001612 A1 Jan. 1, 2026

(30) Foreign Application Priority Data

Jul. 6, 2022 (DE) ..................... 10 2022 206 914.5

(51) Int. Cl.
*B62J 50/22* (2020.01)
*B62J 45/20* (2020.01)

(52) U.S. Cl.
CPC ............... *B62J 50/22* (2020.02); *B62J 45/20* (2020.02)

(58) Field of Classification Search
CPC ....... B60W 30/18145; B60W 30/0956; B60W 40/09; G08G 1/096716; G08G 1/0112;
(Continued)

(56) References Cited

U.S. PATENT DOCUMENTS 9,078,391 B2 * 7/2015 Pichlmaier ............. A01B 63/14
9,095,089 B2 * 8/2015 Pichlmaier ............. A01B 76/00
(Continued)

FOREIGN PATENT DOCUMENTS

DE 102014225625 A1 6/2016
DE 102017209667 A1 6/2018
(Continued)

OTHER PUBLICATIONS

International Search Report for PCT/EP2023/065714, Issued Sep. 20, 2023.

*Primary Examiner* — Yuri Kan
(74) *Attorney, Agent, or Firm* — Norton Rose Fulbright US LLP

(57) ABSTRACT

A method for determining a suitable curve speed for vehicles. With reference to a current user of the vehicle, initially in a first step, for at least one particular curve, a ratio of a curve speed traveled by the user on the particular curve in the past to the curve speed traveled by at least one other driver on the same at least one particular curve in the past is formed, and then, in a second step, for a current or upcoming curve, at least one curve speed selected by at least one other driver for the current or upcoming curve in the past is used and is multiplied by the ratio calculated in the first step, and then, in a third step, the speed ascertained in the second step is output as a speed recommendation to the user of the vehicle by means of an output unit.

9 Claims, 1 Drawing Sheet

(58) Field of Classification Search
CPC ........ A01B 76/00; A01B 63/14; H05B 47/19; B64F 1/002
See application file for complete search history.

(56) References Cited

U.S. PATENT DOCUMENTS

| | | | | |
|---|---|---|---|---|
| 10,037,704 | B1 * | 7/2018 | Myr | B64F 1/002 |
| 2011/0301802 | A1 * | 12/2011 | Rupp | G08G 1/096716 701/408 |
| 2013/0054049 | A1 * | 2/2013 | Uno | B60W 30/18145 701/1 |
| 2017/0027042 | A1 * | 1/2017 | Eskonen | H05B 47/19 |
| 2017/0057411 | A1 * | 3/2017 | Heath | G08G 1/0112 |
| 2021/0284176 | A1 * | 9/2021 | Wiesenberg | B60W 40/09 |
| 2024/0308507 | A1 * | 9/2024 | Kueperkoch | B60W 30/0956 |

FOREIGN PATENT DOCUMENTS

| | | | |
|---|---|---|---|
| DE | 102017006798 | A1 | 1/2019 |
| DE | 102019103554 | A1 | 8/2020 |
| DE | 102019215376 | A1 | 4/2021 |
| DE | 102019217429 | A1 | 5/2021 |
| EP | 2189959 | A1 | 5/2010 |
| EP | 2988285 | A1 | 2/2016 |
| EP | 3048025 | A1 | 7/2016 |
| KR | 20180077587 | A | 7/2018 |
| WO | 2010011806 | A1 | 1/2010 |

* cited by examiner

10

12 start 14 collect vehicle speed data 16 link to data of a navigation system 18 check whether vehicle is traversing a curve 20 store as data pair 22 store

METHOD FOR DETERMINING A SUITABLE CURVE SPEED FOR VEHICLES, DEVICE FOR PERFORMING SAID METHOD, AND USE THEREOF

FIELD

The present invention relates to a method for determining a suitable curve speed for vehicles, a device for performing the method, and the use thereof.

BACKGROUND INFORMATION

Technical approaches already exist to warn a driver of a vehicle, in particular a two-wheeled vehicle, when traveling at an excessive speed with respect to a curve in front of the driver. A challenge is to determine a critical speed for traversing an upcoming curve. For example, approaches that are purely related to driving dynamics have already been pursued, e.g., for motorcycles.

In this respect, U.S. Patent Application Publication No. US 2013/0054049 A1 describes a driver assistance system, in which historical driving data of a driver are stored and are examined with regard to their response pattern. Based on these historical data, it is estimated to what extent future actions of the driver are required, and this is then provided to the driver assistance system accordingly.

Furthermore, Germany Patent Application No. DE 10 2017 006 798 A1 describes a method for outputting a warning signal by means of a navigation device, wherein, when the driver approaches a hazardous location, it is assessed how the driver has acted in the past with respect to such a hazardous location and a warning signal is output depending on the assessment result.

European Patent Application No. EP 2 189 959 A1 describes a further warning method, in which a traffic infrastructure transmitting unit transmits location-specific information, which can be communicated to the driver via a receiver unit in the motor vehicle. This communication takes place when certain situational criteria are met.

Furthermore, a method for supporting a driver of a single-track motor vehicle for safely traversing a curve is described in Germany Patent Application No. DE 10 2014 225 625 A1. In this method, firstly, current vehicle data are collected and, secondly, historical vehicle data with respect to limit conditions of the vehicle are also considered. Furthermore, navigation data are considered. If a hazard threshold value is exceeded, a warning signal is output.

SUMMARY

The present invention provides a method for determining a suitable curve speed for vehicles, a device for performing the method, and the use thereof.

According to the present invention, a method for determining a suitable curve speed for vehicles is provided for a user. According to an example embodiment of the present invention, in a first step, a ratio is calculated from historical data that relate to traversing at least one particular curve that has been traversed by the user, wherein the curve speed that was achieved at that time is known. A ratio is formed of that curve speed to at least one curve speed of at least one other driver for the relevant at least one curve in the past. The obtained ratio is then multiplied by at least one curve speed for an upcoming or current curve for the user that has been traversed by other drivers at the relevant curve speed in the past. The speed thus ascertained computationally for traversing the curve is output as the recommended speed to the user of the vehicle.

The particular advantage of this procedure is that by linking historical data of the user of a vehicle with corresponding speed data from users of other vehicles, individual user behavior can be considered when calculating a recommended speed for traversing curves. This individual behavior may be reflected, for example, in the individual ability, the technical constraints of the vehicle used, or the driver's readiness to take risks. This leads to greater acceptance when a recommended speed with respect to the driving behavior of the user of a vehicle is considered.

Further advantageous embodiments of the present invention are disclosed herein.

It may be advantageous if, for a particular curve, consideration is given to a plurality of curve speeds that were selected by other drivers when traversing the relevant curve in the past, and if, based on this plurality of curve speeds, a mean value, a quantile or an analysis based on standard deviations is performed and used for forming the ratio in the first step of the described method.

Furthermore, it may be advantageous if curve speeds for the current or upcoming curve are also considered for forming the ratio according to the first method step of the method described above. This applies both to the use of curve speeds driven by other drivers on the relevant present or upcoming curve in the past and to the curve speeds selected by the current user of the vehicle for the relevant curve in the past.

According to a particularly advantageous example embodiment of the present invention, roadway parameters are additionally considered for calculating a recommended speed for traversing a curve. These roadway parameters are in particular a roadway condition in the area of the relevant curve, the angle subtended by the curve, a possible slope of the roadway, the number of lanes, the geographic location of the curve, the overall curviness of the route, the width of the roadway, the course of the curvature of the roadway within the curve, a possible transverse gradient or possible administrative speed limits.

In this respect, it may be furthermore advantageous if the consideration of roadway parameters is carried out such that only curves that, with respect to their roadway parameters, have a similarity to an upcoming or current curve with respect to the user of a vehicle to a specifiable extent are used for forming the ratio according to the first method step. In this way, the reliability and usability of a speed recommended for traversing a curve and, thus, also the acceptance of such recommended speeds are significantly increased by the method described above.

According to a further advantageous example embodiment of the present invention, the age of the data used for forming the ratio according to the method described above is also considered with respect to a curve speed on a relevant curve. This is done in such a way that older data are considered less than newer data when forming the ratio. This may be done, for example, by considering an age factor for corresponding speed data.

According to a further, particularly advantageous example embodiment of the present invention, for ascertaining a suitable curve speed for a current or upcoming curve, vehicle-specific data, such as curve travel actually realized by the vehicle, slanted positions of the vehicle, possible interventions by an assistance system of the vehicle and parameters that characterize the driver behavior, are also considered in addition to the ratio of curve speeds according to the first method step of the method described above.

This consideration allows a possible correction with respect to the output value of a suitable curve speed for the relevant vehicle. Depending on the availability of vehicle data from other drivers, it is also possible to use corresponding vehicle data for forming the ratio according to the first method step, by only considering curve speeds from those other users for a particular curve whose vehicle data within a specified scope have a similar profile to the vehicle data of the user of the relevant vehicle.

According to an example embodiment of the present invention, a driver assistance system, which comprises means for performing the method according to the present invention described above, is additionally provided for single-track motor vehicles in particular. In addition to an optical or acoustic display unit for rendering a calculated suitable curve speed, the driver assistance system may additionally comprise a control unit. This control unit comprises, for example, a data storage device for storing historical data with respect to curve speeds of the user or curve speeds of other driver with respect to predetermined curves. Furthermore, a transceiver unit is, for example, provided for receiving such data and/or storing such data in external data storage systems.

The above-described driver assistance system can advantageously be used to operate single-track motor vehicles.

BRIEF DESCRIPTION OF THE DRAWINGS

Example embodiments of the present invention are shown in the figures and explained in more detail in the following description of the figures.

DETAILED DESCRIPTION OF EXAMPLE EMBODIMENTS

Figures 1, 2:
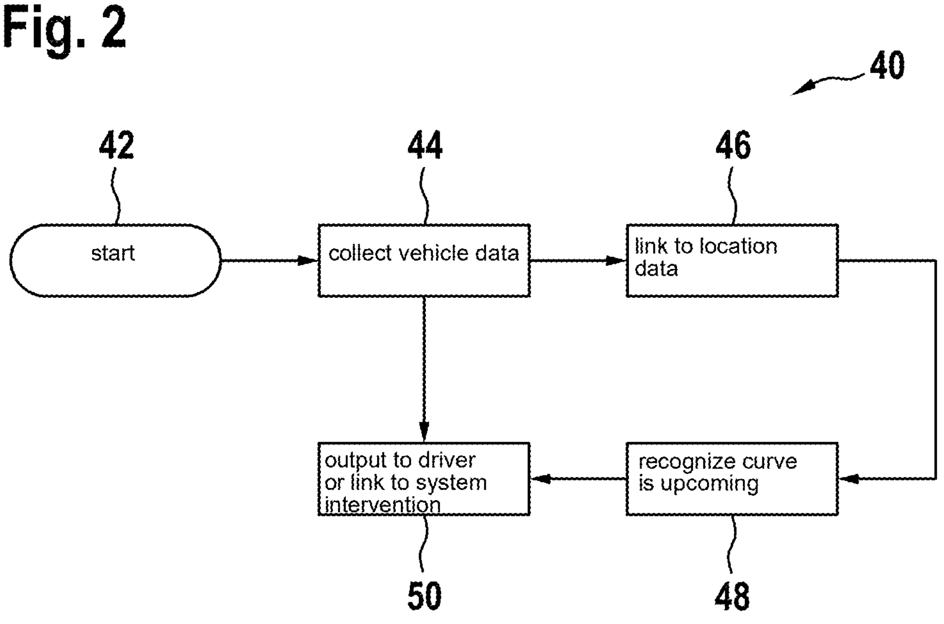
FIG. 1 shows a schematic sequence of a method for generating curve data, according to an example embodiment of the present invention.
FIG. 2 shows the schematic sequence of a method for ascertaining a suitable curve speed for a vehicle according to an example embodiment of the present invention.

FIG. 1 schematically shows a method for generating curve data, which serve as the basis for performing the method according to the present invention for ascertaining a suitable curve speed.

The method of data collection 10 is started in a first method step 12 at a suitable time during the operation of a vehicle. In a second method step 14, vehicle data, in particular vehicle speed data, are collected by means of sensors on the vehicle or in the area of the driver during the journey of the vehicle. The collected vehicle data are then, for example, linked to data of a navigation system of the vehicle in a third method step 16 in such a way that the collected vehicle data can be stored in a map in connection with local position data. In a fourth method step 18, it is checked whether the vehicle is traversing a curve at the current time.

If this is not the case, the method returns to the second method step 14 and goes through the method of data collection 10 again. If, in the fourth method step 18, it is detected that the vehicle is traversing a curve at the current time, then the vehicle data collected while traversing the curve are assigned to the curve and accordingly stored as a data pair in a fifth method step 20. The data are then stored in a sixth method step 22.

FIG. 2 schematically shows, by way of example, the sequence of a method according to the present invention for providing suitable curve speeds for a vehicle. The same reference signs indicate the same method steps as in FIG. 1.

The method for determining a suitable curve speed for a vehicle 40 is started in a first method step 42. In a second method step 44, comparably to the second method step 14 according to FIG. 1, vehicle data of a vehicle controlled by the user are collected periodically or continuously by means of sensors in the area of the vehicle or driver. In a third method step 46, the collected vehicle data are linked to location data by means of a navigation system, for example. If, based on existing location data, it is recognized in a fourth method step 48 that a curve is upcoming, it is first checked whether historical vehicle data of the user's own vehicle, or ego vehicle, are already available and/or whether vehicle data obtainable or obtained from an external data source with respect to the upcoming or current curve exist.

Furthermore, a ratio is calculated from historical data that relate to traversing at least one particular curve that does not have to correspond to the currently upcoming curve and that has already been traversed by the user in the past, wherein the curve speed that was achieved at that time is known. A ratio is formed of that curve speed to at least one curve speed of at least one other driver for the same relevant, at least one curve in the past.

The obtained ratio is then multiplied by the curve speed corresponding to the historical vehicle data for the upcoming or current curve for the user. The speed thus ascertained computationally for traversing the curve is output optically or haptically to the driver as a suitable curve speed in a fifth method step 50 or is optionally linked to a system intervention, for example to a braking intervention.

It is advantageous here if, for a particular curve, consideration is given to a plurality of curve speeds that were selected by other drivers when traversing the relevant curve in the past, and if, based on this plurality of curve speeds, a mean value, a quantile or an analysis based on standard deviations is performed and used for forming the ratio in the first step of the described method.

If no ego vehicle data are available for performing the fourth method step 48, the ratio of the curve speed selected by the user and curve speeds selected by other drivers is calculated based on data sets that relate to curves for which both curve speeds selected by the user and curve speeds selected by other drivers are available. The resulting ratio is then multiplied by the average curve speed selected by other drivers for the upcoming curve. Additionally, the time rank of the curve-specific vehicle data used and roadway parameters of the relevant curve may also be considered in the calculation according to the fourth method step 48. This is done in the manner described above.

In an alternative embodiment, there is the possibility of not re-forming the ratio according to the fourth method step 48 of the method according to the present invention for each data set, but rather calculating and providing it once based on a model. Such a model calculation may be performed, for example, by adding a self-learning system. For example, for creating this model, a multitude of historical data with respect to curve speeds of the user of the vehicle as well as other drivers is considered and used for calculations.

The present invention also provides a vehicle assistance system comprising means for performing at least the method for determining a suitable curve speed according to FIG. 2 but optionally also for performing a method for collecting data according to FIG. 1. For this purpose, the driver assistance system ideally comprises a control unit comprising such a means for performing the method according to the present invention. Furthermore, the driver assistance system comprises, for example, a data storage area and/or a means for sending and receiving external data. In addition, the driver assistance system comprises, for example, a haptic, acoustic or optical output system by means of which a suitable or recommended curve speed can be communicated to a user of the vehicle.

The invention claimed is:

1. A method for determining a suitable curve speed for a single-track motor vehicle, the method comprising:

with reference to a current user of the vehicle, initially in a first step, for at least one particular curve, forming a ratio of a curve speed traveled by the current user on the at least one particular curve in the past to a curve speed traveled by at least one other driver on the same at least one particular curve in the past;

in a second step, for a current or upcoming curve, multiplying at least one curve speed selected by at least one other driver for the current or upcoming curve in the past, by the ratio ascertained in the first step;

in a third step, outputting a speed ascertained in the second step as a speed recommendation to the current user of the vehicle; and operating a driver assistance system to produce haptic output to the current user based on the output speed.

2. The method according to claim 1, wherein, for the at least one particular curve, a plurality of curve speeds of other drivers on the at least one particular curve in the past is used and a mean value, quantile, or analysis of standard deviations of relevant curve speeds for the at least one particular curve is used as a basis for forming the ratio in the first step.

3. The method according to claim 1, wherein past curve speeds of other drivers and curve speeds of the current user of the vehicle for the upcoming or current curve are also included in the ratio formation according to the first method step.

4. The method according to claim 1, wherein roadway parameters of the upcoming or current curve are additionally considered for ascertaining a recommended curve speed, wherein the roadway parameters include at least one of: a roadway quality, a number of lanes of the roadway, a course of a curvature, a road width, an angle subtended by the curve, an overall curviness of a route, a road category, a transverse gradient, a possible slope of the road, a geographic location, and an administrative speed limits.

5. The method according to claim 4, wherein consideration of the roadway parameters is carried out in such a way that only roadways that are similar in terms of their roadway parameters to the current or upcoming curve to a specifiable extent are considered for calculation of the ratio according to the first method step.

6. The method according to claim 1, wherein an age of data that are considered in the ratio formation and that are historical data regarding the curve speed for at least one particular curve is also considered when forming the ratio according to the first method step, such that older data are less heavily weighted than newer data.

7. The method according to claim 1, wherein additional vehicle data of the vehicle currently being used by the current user, including: (i) an actually driven curvature, and/or (ii) slanted positions of the vehicle, and/or (iii) possible interventions by assistance systems of the vehicle and/or (iv) a driver behavior, are included for calculating a suitable curve speed for the current or upcoming curve.

8. A driver assistance system for a single-track motor vehicle, the driver assistance system comprising:

an arrangement configured to determine a suitable curve speed for vehicles, by performing:

with reference to a current user of the vehicle, initially in a first step, for at least one particular curve, forming a ratio of a curve speed traveled by the current user on the at least one particular curve in the past to a curve speed traveled by at least one other driver on the same at least one particular curve in the past;

in a second step, for a current or upcoming curve, multiplying at least one curve speed selected by at least one other driver for the current or upcoming curve in the past, by the ratio ascertained in the first step;

in a third step, outputting a speed ascertained in the second step as a speed recommendation to the current user of the vehicle using the driver assistance system; and operating the driver assistance system to produce haptic output to the current user based on the output speed.

9. A single-track motor vehicle, comprising:

a driver assistance system for the single-track motor vehicle, the driver assistance system including:

an arrangement configured to determine a suitable curve speed for vehicles, by performing:

with reference to a current user of the vehicle, initially in a first step, for at least one particular curve, forming a ratio of a curve speed traveled by the current user on the at least one particular curve in the past to a curve speed traveled by at least one other driver on the same at least one particular curve in the past;

in a second step, for a current or upcoming curve, multiplying at least one curve speed selected by at least one other driver for the current or upcoming curve in the past, by the ratio ascertained in the first step;

in a third step, outputting a speed ascertained in the second step as a speed recommendation to the current user of the vehicle using the driver assistance system; and operating the driver assistance system to produce haptic output to the current user based on the output speed.

* * * * *